Sept. 22, 1942.  W. R. OYSTON ET AL  2,296,732

FLUID VALVE

Filed Oct. 16, 1939

Inventor
William R. Oyston
John L. Cloudsley
by
*[signature]*
Attorney

Patented Sept. 22, 1942

2,296,732

UNITED STATES PATENT OFFICE 2,296,732

FLUID VALVE

William Robert Oyston and John Leslie Cloudsley, London, England, assignors to John Leslie Cloudsley, London, England, and Alfred Brash, Melbourne, Victoria, Australia Application October 16, 1939, Serial No. 299,776
In Great Britain September 23, 1938

2 Claims. (Cl. 277—45)

The present invention relates to fluid valves for shock-absorbing or fluid-pressure-relieving apparatus, especially for shock-absorbers for use on motor road vehicles. One of the principal objects of the invention is the provision in a shock-absorber of the fluid displacement type of a fluid valve that is simple in structure, easy to assemble and disassemble, and that is not liable to be clogged and rendered ineffective by minute particles of grit or like foreign matter.

In accordance with one aspect of the present invention, a fluid valve for shock-absorbing or fluid-pressure-relieving apparatus comprises one or more laminae constituting a laminar valve member which normally bears against a seat, a lamina of the valve member and/or the seat against which it bears being cutaway, or provided with a slot, or otherwise formed to permit a restricted flow of fluid past the valve seat whilst the valve member bears thereagainst.

Further in accordance with the present invention, a fluid valve for shock-absorbing or fluid-pressure-relieving apparatus comprises one or more laminae constituting a laminar valve member movable from a valve seat by flow of fluid in one direction, fluid pressure in the opposite direction serving to cause said member to seal the seat and obstruct fluid flow therepast until said pressure reaches a predetermined value whereupon the member is temporarily deformed thereby so that a portion thereof unseals a second valve seat, thereby permitting flow of fluid therepast and relief of the pressure.

In order that the invention may be fully understood and carried into effect an embodiment thereof will now be described with reference to the accompanying drawing, in which.

Figure 1:
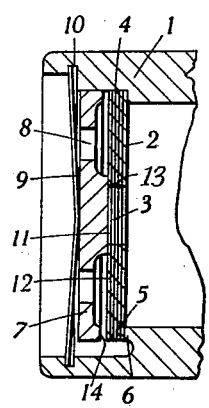
Figure 1 is a longitudinal sectional view, taken along the line II—II of Figure 2, of a portion of a piston adapted to form part of a shock-absorber of the fluid displacement type and embodying the present invention.
Figure 2:
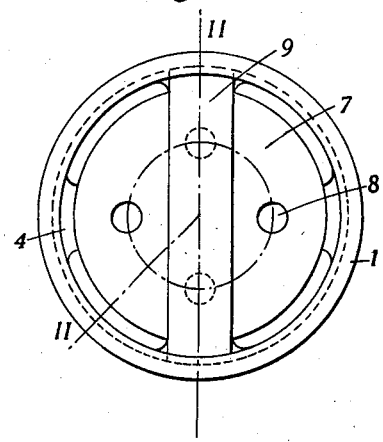
Figure 2 is an end view of the apparatus shown in Figure 1 as viewed from the left-hand side of that figure.
Figure 3:
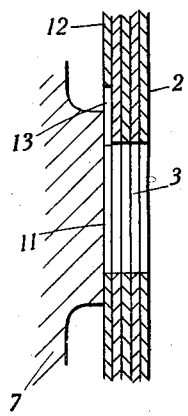
Figure 3 is an enlarged view of a portion of Figure 1.
Figure 3A:
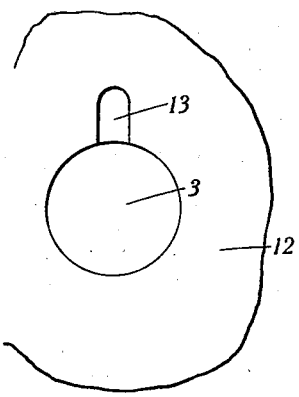
Figure 3a shows a portion of one of the laminae of Figure 3 as viewed from the left of Figure 3, the seat or boss having been omitted.

The embodiment to be described is that illustrated in Figures 1, 2, 3 and 3a wherein reference numeral 1 indicates a piston forming one of a pair which are adapted to be reciprocated within an oil filled cylinder, upon relative movement of two members such as the axle and chassis of a motor road vehicle. The piston shown in Figure 1 is provided with a valve assembly which serves to control the flow of fluid from one side of the piston to the other, and said valve assembly is constituted by a laminar valve member 2 comprising a plurality of laminae formed with a central orifice 3. Valve member 2 is maintained centrally within piston 1 by an interrupted flange 4 formed in piston 1, and normally bears against a valve seat 5 constituted by an internal circular upstanding edge 6 formed in the piston. Adjacent valve member 2 is a rigid plate 7 formed with orifices 8 permitting the flow of fluid therethrough. Plate 7 is supported centrally within piston 1 by the interrupted flange 4 already referred to, and is pressed against valve member 2 by a slightly bowed spring 9 which engages in a circular groove 10 formed within piston 1. Plate 7 is formed with a boss or protuberant seat portion 11 which serves as a seat or closure for the orifice 3 of valve 2 when the parts are in the position shown in Figure 1. The lamina 12 that lies next to seat 11 is, in addition to being formed with the orifice 3, provided with a cutaway portion 13 which provides a bleed hole or metering orifice through which a restricted flow of fluid can take place even when valve 2 bears against the seat 11. The arrangement above described possesses the advantage that, during quick functioning of the valve assembly, the laminar valve 2 acts as a cushion for plate 7 as the latter moves rapidly on to the central or seating portion of valve 2. The operation of the valve device herein described is briefly as follows:—Movement of piston 1 to the right as viewed in Figure 1 constitutes the recuperating stroke of the piston, and oil then tends to pass through the piston from right to left. The leftward oil pressure under these circumstances causes valve member 2 and plate 7 to move leftwardly against the tension of spring 9, valve member 2 is lifted off its peripheral seat 5, and fluid flows past that seat to the left of piston 1. When piston 1 is moved leftwardly as viewed in Figure 1, such movement constituting the shock-absorbing stroke, oil within the cylinder passes through orifices 8 and bears against valve member 2 causing the same to seat firmly on seat 5; as the oil pressure rises it tends to deform temporarily valve member 2 by pressing its central part towards the right and at the same time the oil pressure bears upon the centre portion of plate 7 causing it to follow-up this rightward movement until the peripheral upstanding edge 14 of the plate abuts against lamina 12. During the whole of this time a limited flow of oil has been taking place through the metering orifice 13 thus permitting slow leftward movement of piston 1, but when the oil pressure reaches a predetermined value the central portion of valve member 2 surrounding the orifice 3 is raised clear of seat 11 thereby permitting flow of fluid therepast.

What we claim is:

1. In a fluid valve, a pair of valve forming members, one of which comprises a laminated disc formed by a series of flexible plates having centrally disposed registering openings, the other member being a rigid disc having a central boss against which the central portion of the laminated disc rests, said rigid disc also having an annular rib surrounding said boss and against which the peripheral portion of the laminated disc rests, the lamina of said laminated disc nearest the boss being provided with a slot extending radially from its central opening and terminating beyond said boss.

2. In a fluid valve, a pair of valve forming members, one of which comprises a laminated disc formed by a series of flexible plates having centrally disposed registering openings, the other member being a rigid disc having a central boss against which the central portion of the laminated disc rests, said rigid disc also having an annular rib surrounding said boss and against which the peripheral portion of the laminated disc rests, the lamina of said laminated disc nearest the boss being provided with a slot extending radially from its central opening and terminating beyond said boss, said rigid disc having openings therethrough in spaced relation to the boss.

WILLIAM ROBERT OYSTON.
JOHN LESLIE CLOUDSLEY.